United States Patent
Weisse

(10) Patent No.: US 11,225,874 B2
(45) Date of Patent: Jan. 18, 2022

(54) TURBINE ENGINE ROTOR BLADE WITH CASTELLATED TIP SURFACE

(71) Applicant: United Technologies Corporation, Farmington, CT (US)

(72) Inventor: Michael A. Weisse, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 39 days.

(21) Appl. No.: 16/722,625

(22) Filed: Dec. 20, 2019

(65) Prior Publication Data

US 2021/0189884 A1 Jun. 24, 2021

(51) Int. Cl.
*F01D 5/20* (2006.01)
*F01D 5/28* (2006.01)

(52) U.S. Cl.
CPC .............. *F01D 5/20* (2013.01); *F01D 5/288* (2013.01); *F05D 2220/32* (2013.01); *F05D 2240/307* (2013.01)

(58) Field of Classification Search
CPC . F01D 5/20; F01D 5/286; F01D 5/288; F05D 2240/307
See application file for complete search history.

(56) References Cited

U.S. PATENT DOCUMENTS

| | | | |
|---|---|---|---|
| 4,118,147 A | 10/1978 | Ellis | |
| 4,738,586 A * | 4/1988 | Harter | F01D 5/20 415/173.5 |
| 5,863,181 A * | 1/1999 | Bost | B64C 11/205 416/224 |
| 5,997,251 A * | 12/1999 | Lee | F01D 5/20 416/97 R |
| 6,027,306 A * | 2/2000 | Bunker | F01D 5/20 415/115 |
| 6,568,909 B2 * | 5/2003 | Szucs | F01D 5/20 29/889.7 |
| 8,376,712 B2 | 2/2013 | Klinetob | |
| 8,647,070 B2 | 2/2014 | Jevons | |
| 8,662,834 B2 | 3/2014 | Kray | |
| 8,840,750 B2 | 9/2014 | Parkin | |
| 8,858,182 B2 | 10/2014 | Schwarz | |
| 9,169,731 B2 | 10/2015 | Hui | |
| 9,702,257 B2 | 7/2017 | Yagi | |
| 9,932,839 B2 * | 4/2018 | Guo | F01D 5/20 |
| 9,995,152 B2 | 6/2018 | Mccomb | |
| 10,287,891 B2 | 5/2019 | Mckaveney | |

(Continued)

FOREIGN PATENT DOCUMENTS

| CN | 104613009 A * | 5/2015 | |
| DE | 193192 C * | 12/1907 | F01D 5/20 |

(Continued)

OTHER PUBLICATIONS

European Search Opinion dated Apr. 26, 2021 for corresponding application EP20215683.2 (Year: 2021).*
EP search report for EP20215683.2 dated Apr. 26, 2021.

*Primary Examiner* — Topaz L. Elliot
(74) *Attorney, Agent, or Firm* — Getz Balich LLC

(57) ABSTRACT

A rotor blade is provided for a turbine engine. This rotor blade includes an airfoil extending longitudinally between a leading edge and a trailing edge. The airfoil extends spanwise to a tip. The airfoil is configured with a plurality of projections arranged longitudinally along the tip.

18 Claims, 14 Drawing Sheets

(56) References Cited

U.S. PATENT DOCUMENTS

| | | |
|---|---|---|
| 10,371,165 B2 | 8/2019 | Weisse |
| 10,794,211 B2 * | 10/2020 | Sheedy ................. F01D 11/122 |
| 10,883,373 B2 * | 1/2021 | Hall ..................... F01D 11/122 |
| 10,883,374 B2 * | 1/2021 | Notarianni .............. F01D 5/147 |
| 10,947,858 B2 | 3/2021 | Jung ..................... F01D 11/006 |
| 2003/0059309 A1 * | 3/2003 | Szucs ...................... F01D 5/20 |
| | | 416/228 |
| 2005/0163617 A1 | 7/2005 | Weisse |
| 2008/0159868 A1 * | 7/2008 | Kray .................... F04D 29/324 |
| | | 416/223 R |
| 2011/0014060 A1 * | 1/2011 | Bolcavage ............... F01D 5/20 |
| | | 416/241 R |
| 2011/0176927 A1 | 7/2011 | Alexander |
| 2011/0182740 A1 * | 7/2011 | Klinetob ................ F01D 5/147 |
| | | 416/224 |
| 2011/0223027 A1 | 9/2011 | Klinetob |
| 2012/0230818 A1 * | 9/2012 | Shepherd ................ F01D 5/20 |
| | | 415/208.1 |
| 2012/0237351 A1 | 9/2012 | Weisse |
| 2013/0108470 A1 | 5/2013 | Weisse |
| 2015/0132142 A1 | 5/2015 | Weisse |
| 2015/0204347 A1 | 7/2015 | Strock |
| 2015/0354373 A1 * | 12/2015 | Guo ...................... F01D 11/122 |
| | | 415/173.4 |
| 2016/0032729 A1 | 2/2016 | Turner |
| 2016/0319672 A1 * | 11/2016 | Jones ...................... F01D 5/20 |
| 2017/0199945 A1 * | 7/2017 | Olive ...................... F01D 5/20 |
| 2017/0226866 A1 * | 8/2017 | Nishimura ............... F02C 7/28 |
| 2018/0274375 A1 * | 9/2018 | Notarianni ............ F04D 29/324 |
| 2018/0328212 A1 * | 11/2018 | Subramaniyan ........ F01D 11/08 |
| 2018/0355732 A1 | 12/2018 | Hall |
| 2019/0078455 A1 | 3/2019 | Jung |
| 2019/0107003 A1 * | 4/2019 | Sheedy ................. F01D 25/183 |

FOREIGN PATENT DOCUMENTS

| | | | | |
|---|---|---|---|---|
| DE | 1576953 A1 * | 12/1970 | ............... | F01D 5/20 |
| DE | 4439726 A1 * | 5/1996 | ............... | F01D 11/08 |
| FR | 2935348 A1 * | 3/2010 | ............ | B64C 11/18 |
| FR | 3026428 A1 * | 4/2016 | ............... | F01D 5/20 |
| JP | 6159151 B2 * | 7/2017 | ............... | F01D 5/20 |
| WO | WO-2011026468 A2 * | 3/2011 | ............... | F01D 5/20 |
| WO | WO-2017177229 A1 * | 10/2017 | ........... | F01D 25/183 |

* cited by examiner

TURBINE ENGINE ROTOR BLADE WITH CASTELLATED TIP SURFACE

BACKGROUND OF THE DISCLOSURE

1. Technical Field

This disclosure relates generally to a gas turbine engine and, more particularly, to a rotor blade for a gas turbine engine.

2. Background Information

Some modern gas turbine engines include composite fan blades. Such composite fan blades typically include an environmental coating to protect underlying composite material. Under certain conditions, tips of the fan blades may rub against a surrounding rub strip/shroud. This rubbing will heat the tip of the blade which may remove the environmental coating from the fan blade tips, leaving the underlying composite material susceptible to deterioration. Therefore, in an effort to or reduce likelihood of tip rub and, thus, removal of the environmental coating, some composite fan blades are sized to provide a relatively large clearance gap between the fan blade tips and the surrounding rub strip/shroud. Such a large clearance gap, however, may allow air to leak over the fan blade tips and thereby decrease efficiency of the gas turbine engine. There is a need in the art therefore for fan blades which can enable reduced leakage over the fan blade tips.

SUMMARY OF THE DISCLOSURE

According to an aspect of the present disclosure, a rotor blade is provided for a turbine engine. This rotor blade includes an airfoil extending longitudinally between a leading edge and a trailing edge. The airfoil extends spanwise to a tip. The airfoil is configured with a plurality of projections arranged longitudinally along the tip.

According to another aspect of the present disclosure, another rotor blade is provided for a turbine engine. This rotor blade includes an airfoil configured with a first side, a second side, a leading edge, a trailing edge, a base and a tip. The first side and the second side each extend longitudinally between the leading edge and the trailing edge. The first side and the second side each extend spanwise from the base to the tip. The airfoil includes an airfoil body and a panel covering a portion of the airfoil body on the first side. The panel is configured with a plurality of tabs bonded to the airfoil body at the tip. The tabs extend across the body at least partially from the first side to the second side.

According to still another aspect of the present disclosure, another rotor blade is provided for a turbine engine. This rotor blade includes an airfoil including a pressure side, a suction side, a leading edge, a trailing edge, a base and a tip. The pressure side and the suction side each extend longitudinally between the leading edge and the trailing edge. The pressure side and the suction side each extend spanwise from the base to the tip. The airfoil is configured with a castellated tip surface that extends longitudinally along the tip and laterally between the pressure side and the suction side.

The projections may be configured to provide the tip with a castellated tip surface.

The castellated tip surface may extend longitudinally from the leading edge to the trailing edge.

The castellated tip surface may extend longitudinally from the leading edge partially towards the trailing edge.

The castellated tip surface may extend longitudinally from the trailing edge partially towards the leading edge.

The airfoil may extend laterally between a pressure side and a suction side. A first of the projections may extend at least partially across the tip from the pressure side towards the suction side.

A first of the projections may extend along a centerline at least partially across the tip between a pressure side of the airfoil and a suction side of the airfoil. The centerline may be parallel with a rotational axis of the rotor blade.

A first of the projections may extend along a centerline at least partially across the tip between a pressure side of the airfoil and a suction side of the airfoil. The centerline may be angularly offset from a rotational axis of the rotor blade by an acute angle.

A first of the projections may extend along a first centerline at least partially across the tip between a pressure side of the airfoil and a suction side of the airfoil. A second of the projections may extend along a second centerline at least partially across the tip between the pressure side of the airfoil and the suction side of the airfoil. The first centerline may be parallel with the second centerline.

A first of the projections may extend longitudinally between a first projection side and a second projection side. The first of the projections may have a first spanwise height at the first projection side. The first of the projections may have a second spanwise height at the second projection side that is equal to the first spanwise height.

A first of the projections may extend longitudinally between a first projection side and a second projection side. The first of the projections may have a first spanwise height at the first projection side. The first of the projections may have a second spanwise height at the second projection side that is different than the first spanwise height.

A first of the projections may extend longitudinally between a first projection side and a second projection side. The first of the projections may be configured with a sharp outer edge along the first projection side.

The airfoil may include a body and a panel covering a portion of the body on a pressure side of the airfoil. The panel may include a plurality of tabs that form the projections.

The airfoil may include a body. The projections may be bonded to the body.

The body may be configured from or otherwise include composite material. The projections may be configured from or otherwise include metal.

The body may be configured from or otherwise include first metal. The projections may be configured from or otherwise include second metal that is different than the first metal.

The airfoil may be configured as a fan blade airfoil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
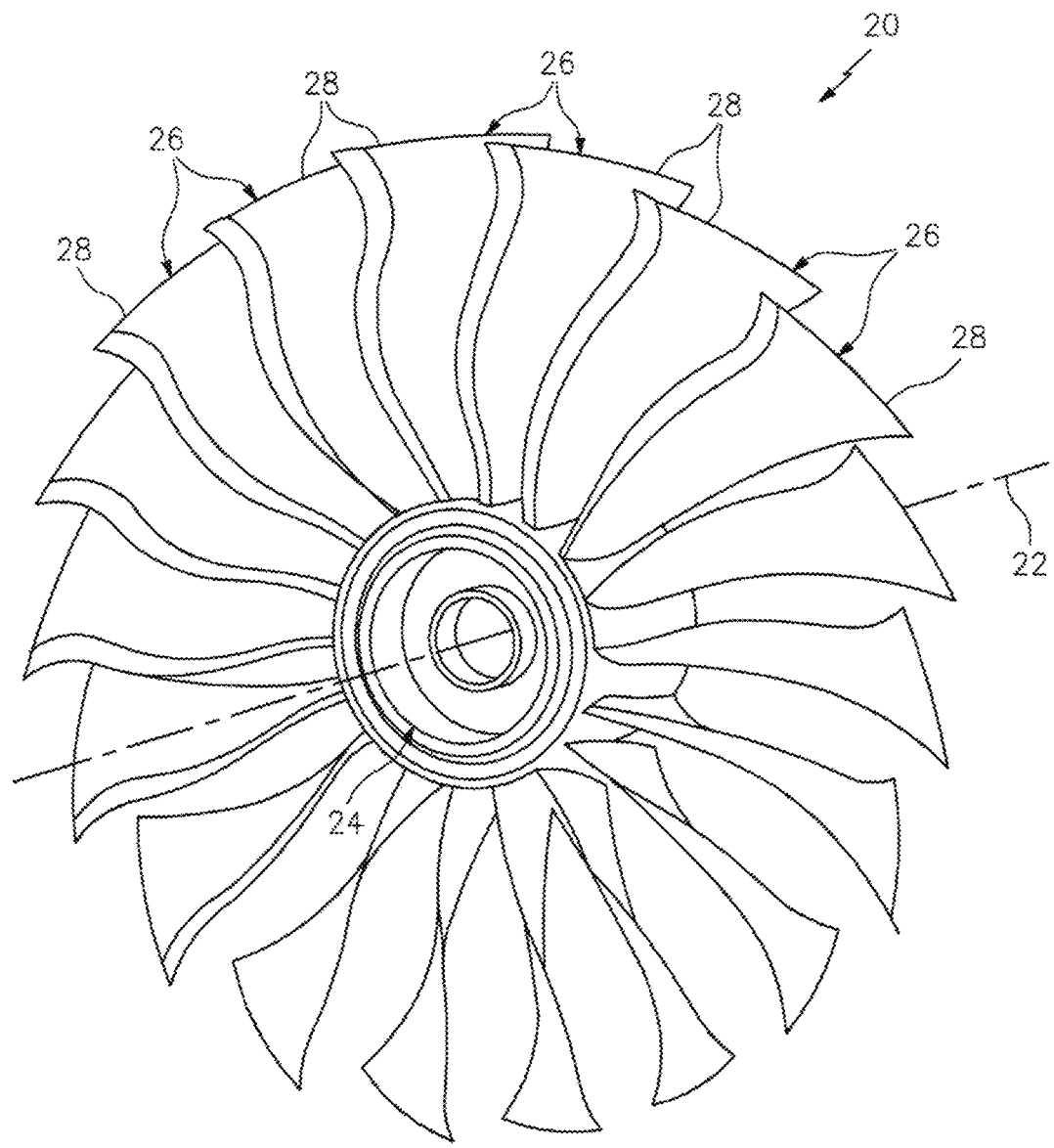
FIG. 1 is a perspective illustration of a rotor for a gas turbine engine.

FIG. 1 is a perspective illustration of a rotor 20 for a gas turbine engine. For ease of description and illustration, the turbine engine rotor 20 may be described below and is illustrated in FIG. 1 as a fan rotor for the gas turbine engine. The present disclosure, however, is not limited to such an exemplary application. For example, in other embodiments, the turbine engine rotor 20 may alternatively be configured as a compressor rotor in a compressor section of the gas turbine engine, or a turbine rotor in a turbine section of the gas turbine engine.

The turbine engine rotor 20 (e.g., fan rotor) of FIG. 1 is configured to rotate about a rotational axis 22. This rotational axis 22 is a centerline of the turbine engine rotor 20, and may be coaxial with a centerline of the gas turbine engine. The turbine engine rotor 20 includes a rotor disk 24 and a plurality of rotor blades 26; e.g., fan blades.

The rotor blades 26 are arranged circumferentially around the rotor disk 24 in an annular array. The rotor blades 26 are connected to the rotor disk 24. Each of the rotor blades 26, for example, may be formed integral with or mechanically fastened, welded, brazed, adhered and/or otherwise attached to the rotor disk 24. Each of the rotor blades 26 projects spanwise in a spanwise direction (e.g., radially relative to the rotational axis 22) out from the rotor disk 24 to a respective tip 28.

Figure 2:
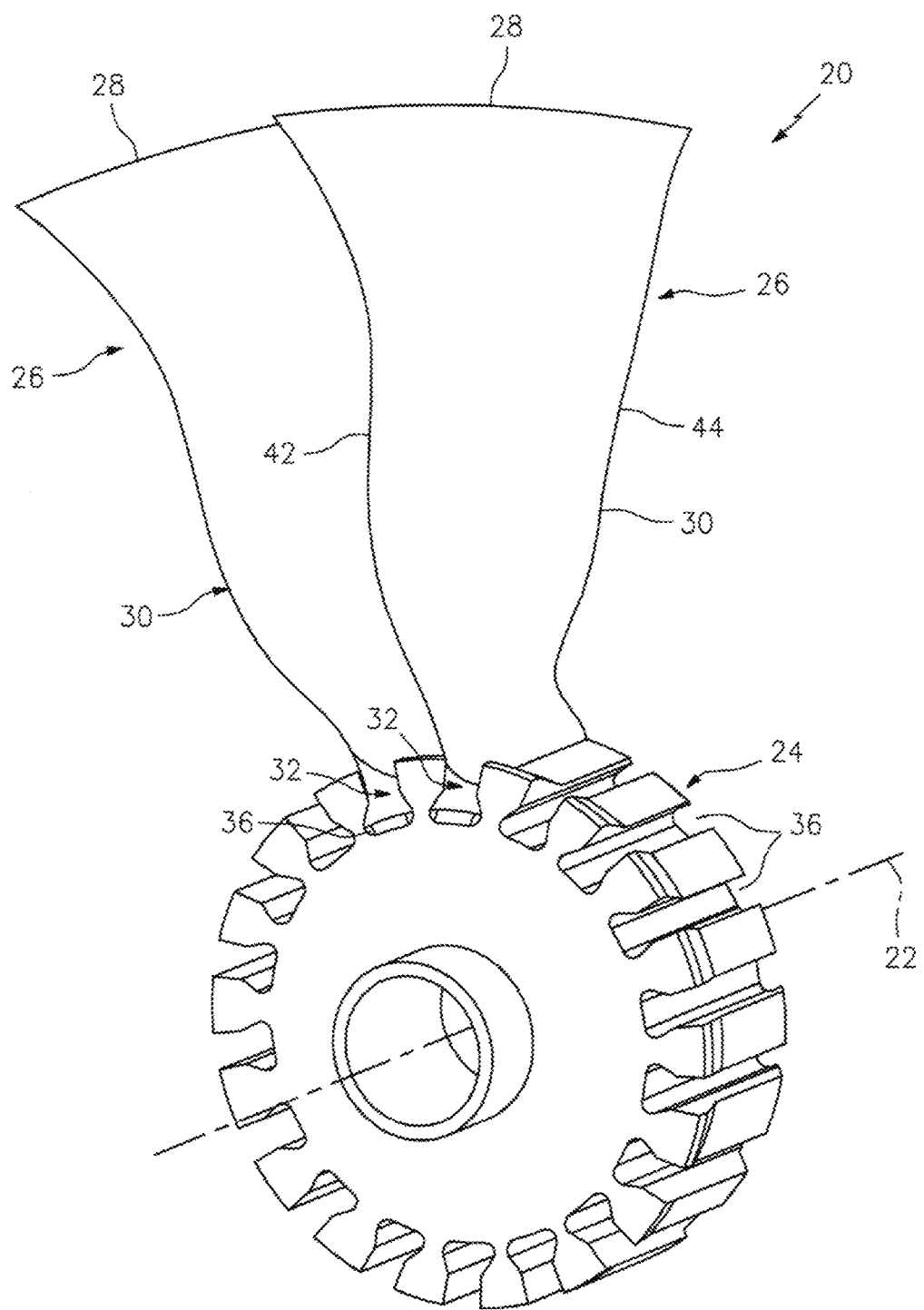
FIG. 2 is a perspective illustration of the turbine engine rotor in a partially assembly state.

Referring to FIG. 2, each of the rotor blades 26 includes an airfoil 30; e.g., a fan blade airfoil. Each rotor blade 26 of FIG. 2 may also include a root 32 and/or a platform 34 (see FIG. 3).

The root 32 is configured to mount the rotor blade 26 to the rotor disk 24. The root 32 of FIG. 2, for example, is configured to mate with (e.g., be inserted into) a slot 36 in the rotor disk 24 to provide an interface/connection between the respective rotor blade 26 and the rotor disk 24. This interface/connection may be, but is not limited to, a dovetail interface/connection or a firtree interface/connection.

Figure 3:
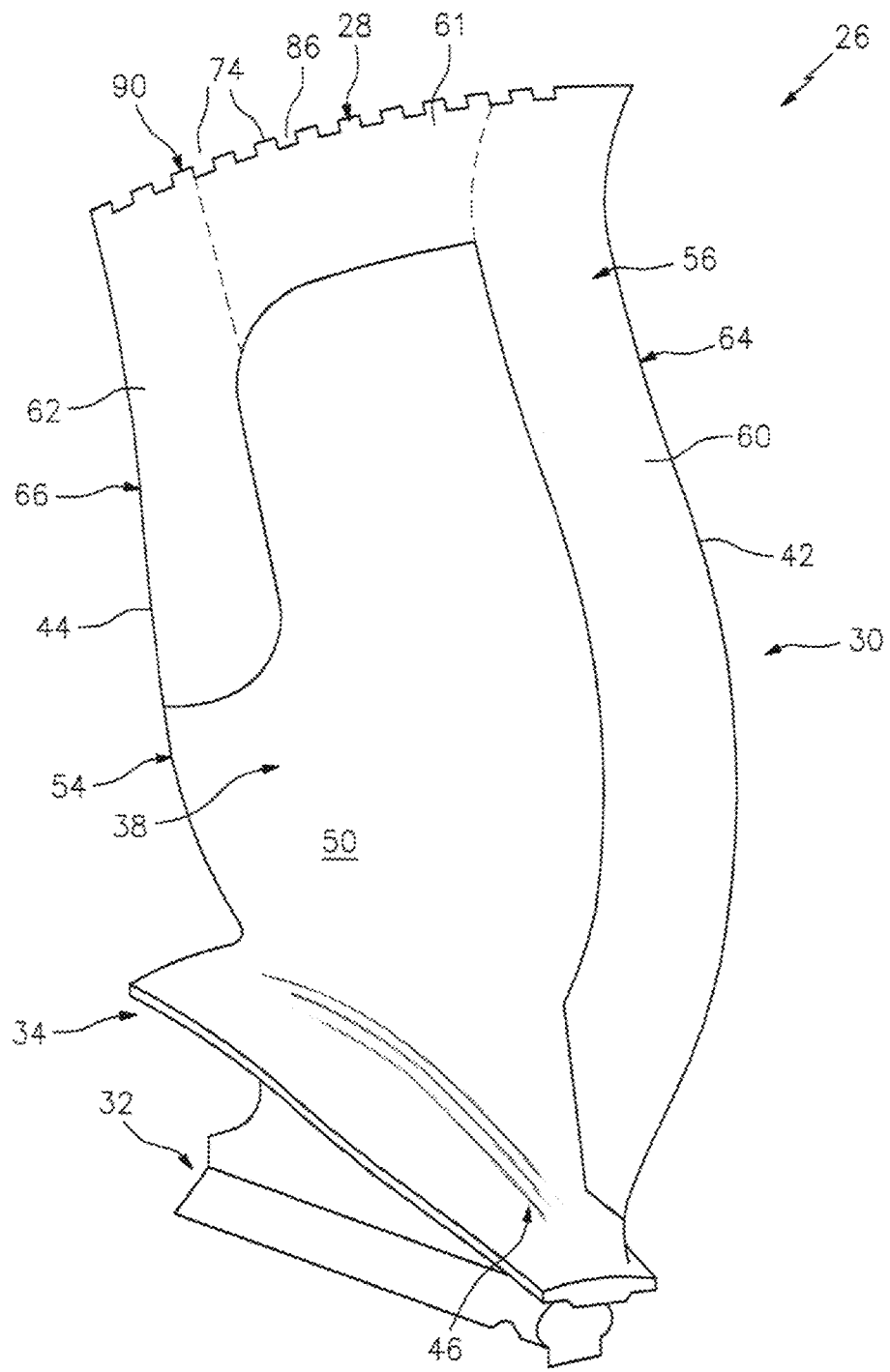
FIG. 3 is a perspective illustration of a first side of a rotor blade with a castellated tip surface, where the castellations in the tip surface are exaggerated for ease of illustration.

Referring to FIG. 3, the platform 34 is arranged radially between and connected to the root 32 and the airfoil 30. The platform 34 is configured to define a portion of an inner peripheral boundary of a flowpath adjacent the rotor blade 26.

Figure 4:
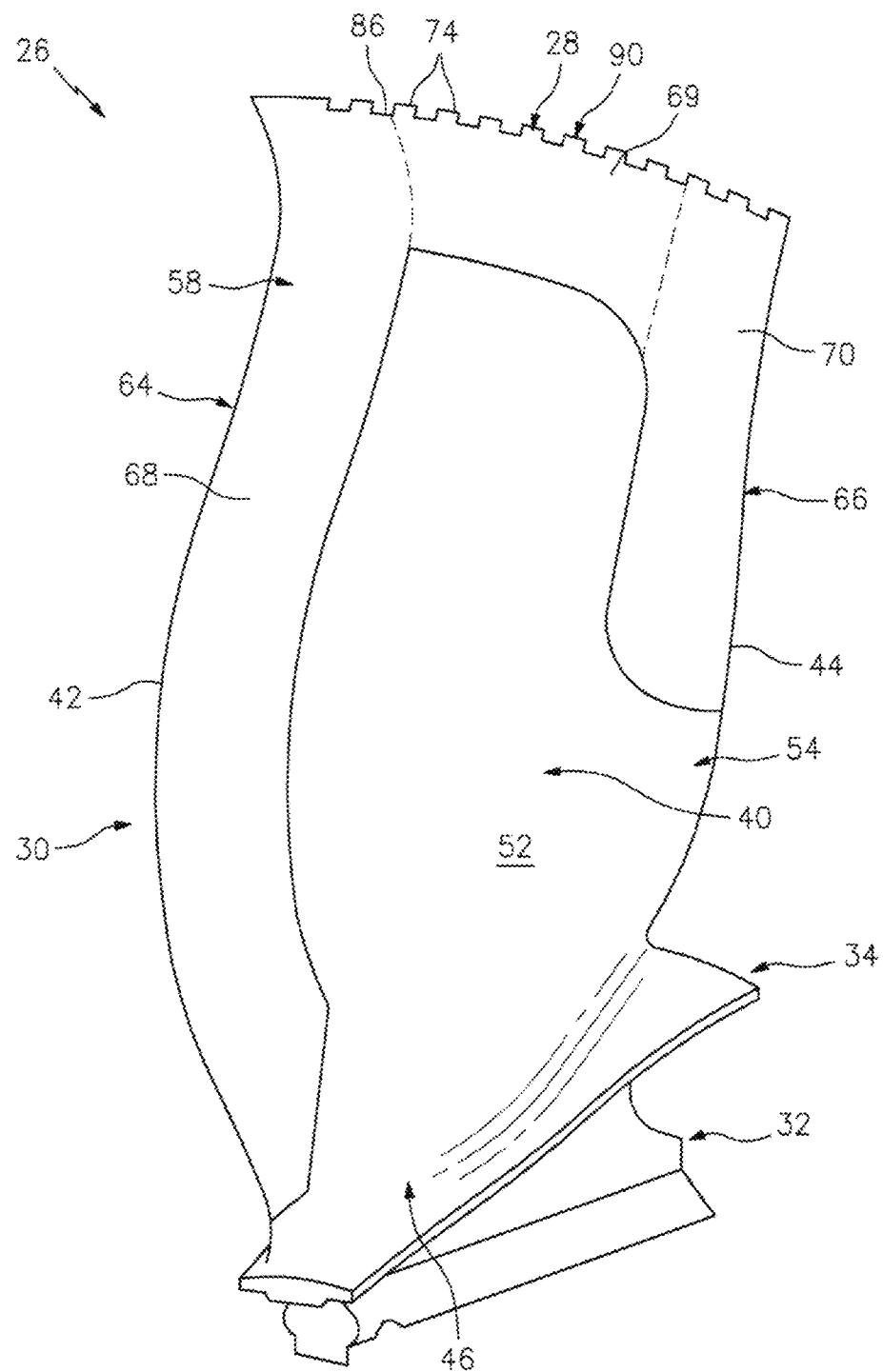
FIG. 4 is a perspective illustration of a second side of the rotor blade with the castellated tip surface, where the castellations in the tip surface are exaggerated for ease of illustration.
Figure 5:
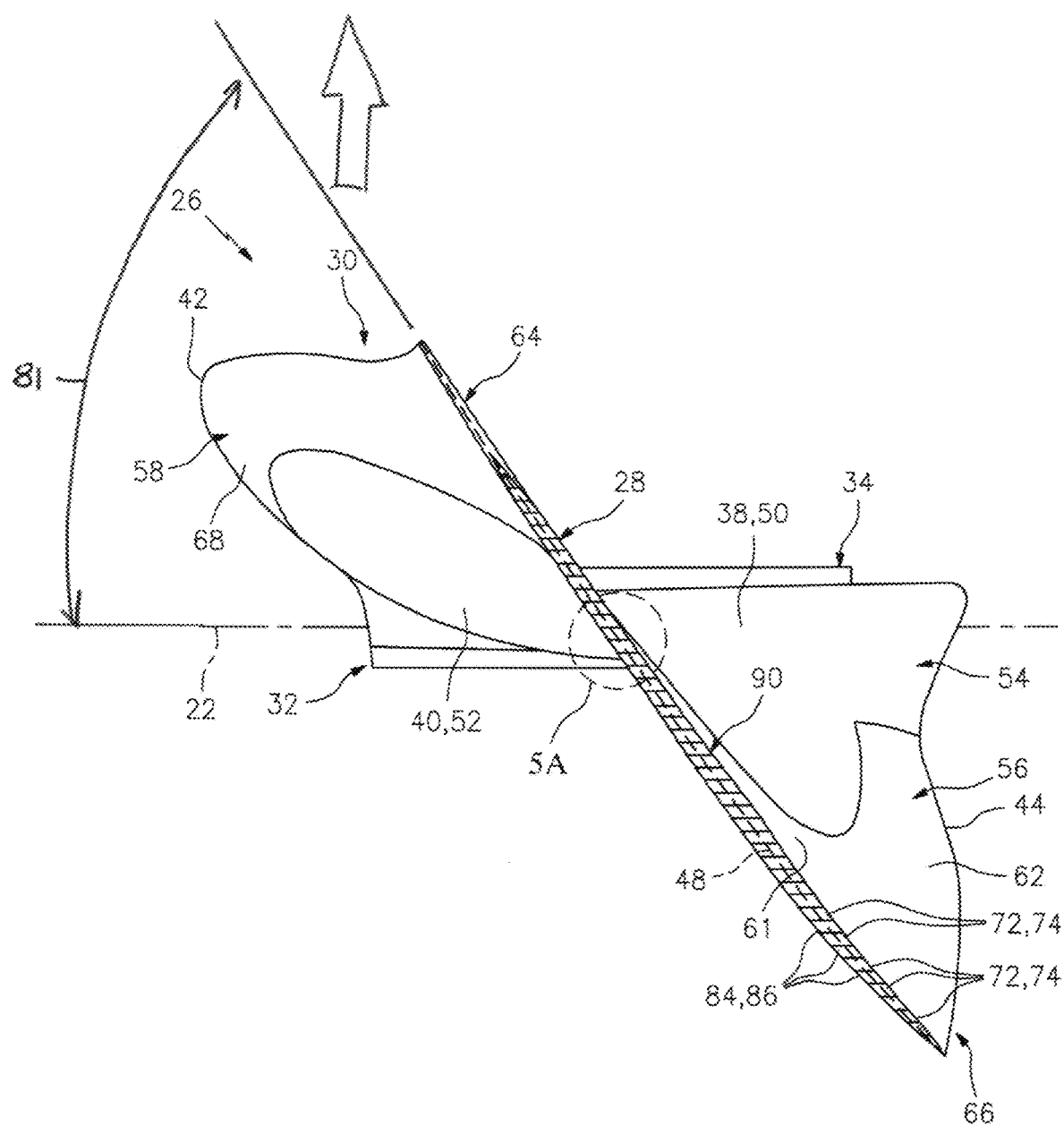
FIG. 5 is an outside looking in illustration of the rotor blade.

Referring to FIGS. 3-5, the airfoil 30 is configured with a first side 38 (see FIG. 3), a second side 40 (see FIG. 4), a leading edge 42, a trailing edge 44, a base 46 (e.g., airfoil root) and the respective tip 28. The airfoil 30 extends laterally (e.g., widthwise, in a direction perpendicular to a camber line 48 of the airfoil 30) between the first side 38 and the second side 40. The airfoil 30 extends longitudinally along the camber line 48 from the leading edge 42 to the trailing edge 44. The airfoil 30 extends spanwise (e.g., radially relative to the rotational axis 22) from the base 46 as well as the platform 34 to the tip 28.

The first side 38 may be configured as a pressure and/or concave side of the airfoil 30 with a (e.g., pressure and/or concave) first side surface 50. The second side 40 is configured laterally opposite the first side 38. The second side 40 may be configured as a suction and/or convex side of the airfoil 30 with a (e.g., suction and/or convex) second side surface 52. Each of the sides 38, 40 and its respective surface 50, 52 extends longitudinally along the camber line 48 from the leading edge 42 to the trailing edge 44. Each of the sides 38, 40 and its respective surface 50, 52 extends spanwise (e.g., radially relative to the rotational axis 22) from the base 46 as well as the platform 34 to the tip 28.

Referring to FIGS. 3 and 4, the leading edge 42 is disposed at an upstream end of the airfoil 30. The leading edge 42 extends spanwise (e.g., radially relative to the rotational axis 22) from the base 46 as well as the platform 34 to the tip 28. The trailing edge 44 is disposed at a downstream end of the airfoil 30. The trailing edge 44 extends spanwise (e.g., radially relative to the rotational axis 22) from the base 46 as well as the platform 34 to the tip 28.

The airfoil 30 of FIGS. 3 and 4 includes an airfoil body 54 and one or more panels 56 and 58. The airfoil body 54 is configured to generally provide the airfoil 30 with the shape and form described above. The airfoil body 54 of FIGS. 3 and 4, for example, projects spanwise (e.g., radially relative to the rotational axis 22) out from the base 46 towards the tip 28. The airfoil body 54 extends longitudinally along the camber line 48 from an edge proximate the leading edge 42 to an edge that partially defines the trailing edge 44. The airfoil body 54 may define at least a portion of the first side 38 and its surface 50, which portion may make up a majority (e.g., more than 50-75%) of the first side 38 and its surface 50. The airfoil body 54 may also or alternatively define at least a portion of the second side 40 and its surface 52, which portion may make up a majority (e.g., more than 50-75%) of the second side 40 and its surface 52. The present disclosure, however, is not limited to the foregoing exemplary embodiment.

The airfoil body 54 may be formed integral with the root 32 and/or the platform 34 as a unitary, monolithic body. The airfoil body 54 may be constructed from an airfoil body material such as, but not limited to, composite material and/or metal. An example of the composite material is, but is not limited to, carbon fiber, aramid fiber and/or fiberglass within a polymer/resin matrix. An example of the metal is, but is not limited to, aluminum (Al) or aluminum lithium alloy.

The panels 56 and 58 are configured to provide a protective covering over select (e.g., edge and/or tip) portions of the airfoil body 54. The panels of FIGS. 3 and 4, for example, include a first side panel 56 and a second side panel 58.

The first side panel 56 of FIG. 3 includes a first leading edge segment 60, a first tip segment 61 and a first trailing edge segment 62. These segments 60-62 may be formed integrally together from a single piece of material. Alternatively, one or more or each of the segments 60-62 (and/or portions thereof) may be discretely formed and subsequently configured together to provide the first side panel 56. Each of the first panel segments 60-62 is bonded to (e.g., adhered, welded and/or brazed) the underlying airfoil body 54.

The first leading edge segment 60 is disposed on the first side 38 of the airfoil 30, and may be configured as a first side wing of a leading edge sheath 64; see also FIG. 5. The first leading edge segment 60 extends spanwise along the leading edge 42 from (or proximate) the base 46 to (or towards) the tip 28. The first leading edge segment 60 partially forms the first side surface 50 along the leading edge 42. The first leading edge segment 60 thereby covers and provides (e.g., impact and/or environmental) protection for the underlying airfoil body 54 along an entirety (or a select portion) of the leading edge 42. The first leading edge segment 60 of FIG. 3 also covers and provides protection for the underlying airfoil body 54 along at least a forward/upstream portion of the tip 28.

The first tip segment 61 is disposed on the first side 38 of the airfoil 30. The first tip segment 61 extends longitudinally along the tip 28 from the first leading edge segment 60 (or alternatively the leading edge 42) to the first trailing edge segment 62 (or alternatively the trailing edge 44). The first tip segment 61 partially forms the first side surface 50 along the tip 28. The first tip segment 61 thereby covers and provides (e.g., impact and/or environmental) protection for the underlying airfoil body 54 along a select portion (or an entirety) of the tip 28.

The first trailing edge segment 62 is disposed on the first side 38 of the airfoil 30, and may be configured as a first side wing of a trailing edge sheath 66. The first trailing edge segment 62 extends spanwise along the trailing edge 44 from an intermediate span point along the trailing edge 44 (or alternatively the base 46) to (or towards) the tip 28. The first trailing edge segment 62 partially forms the first side surface 50 along the trailing edge 44. The first trailing edge segment 62 thereby covers and provides (e.g., impact and/or environmental) protection for the underlying airfoil body 54 along a select portion (or an entirety) of the trailing edge 44. The first trailing edge segment 62 of FIG. 3 also covers and provides protection for the underlying airfoil body 54 along at least an aft/downstream portion of the tip 28.

The second side panel 58 of FIG. 4 includes a second leading edge segment 68, a second tip segment 69 and a second trailing edge segment 70. These segments 68-70 may be formed integrally together from a single piece of material. Alternatively, one or more or each of the segments 68-70 (and/or portions thereof) may be discretely formed and subsequently configured together to provide the second side panel 58. Each of the second panel segments 68-70 is bonded to (e.g., adhered, welded and/or brazed) the underlying airfoil body 54.

The second leading edge segment 68 is disposed on the second side 40 of the airfoil 30, and may be configured as a second side wing of the leading edge sheath 64; see also FIG. 5. The second leading edge segment 68 extends spanwise along the leading edge 42 from (or proximate) the base 46 to (or towards) the tip 28. The second leading edge segment 68 partially forms the second side surface 52 along the leading edge 42. The second leading edge segment 68 thereby covers and provides (e.g., impact and/or environmental) protection for the underlying airfoil body 54 along an entirety (or a select portion) of the leading edge 42. The second leading edge segment 68 of FIG. 3 also covers and provides protection for the underlying airfoil body 54 along at least a forward/upstream portion of the tip 28.

The second tip segment 69 is disposed on the second side 40 of the airfoil 30. The second tip segment 69 extends longitudinally along the tip 28 from the second leading edge segment 68 (or alternatively the leading edge 42) to the second trailing edge segment 70 (or alternatively the trailing edge 44). The second tip segment 69 partially forms the second side surface 52 along the tip 28. The second tip segment 69 thereby covers and provides (e.g., impact and/or environmental) protection for the underlying airfoil body 54 along a select portion (or an entirety) of the tip 28.

The second trailing edge segment 70 is disposed on the second side 40 of the airfoil 30, and may be configured as a second side wing of the trailing edge sheath 66. The second trailing edge segment 70 extends spanwise along the trailing edge 44 from an intermediate span point along the trailing edge 44 (or alternatively the base 46) to (or towards) the tip 28. The second trailing edge segment 70 partially forms the second side surface 52 along the trailing edge 44. The second trailing edge segment 70 thereby covers and provides (e.g., impact and/or environmental) protection for the underlying airfoil body 54 along a select portion (or an entirety) of the trailing edge 44. The second trailing edge segment 70 of FIG. 3 also covers and provides protection for the underlying airfoil body 54 along at least an aft/downstream portion of the tip 28.

Figure 14:
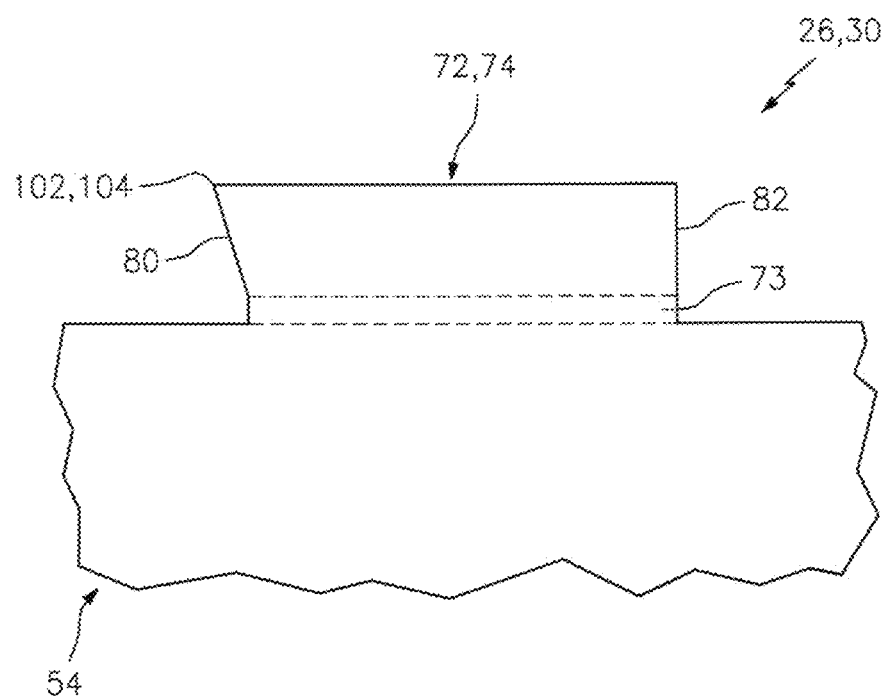
Figure 15A:
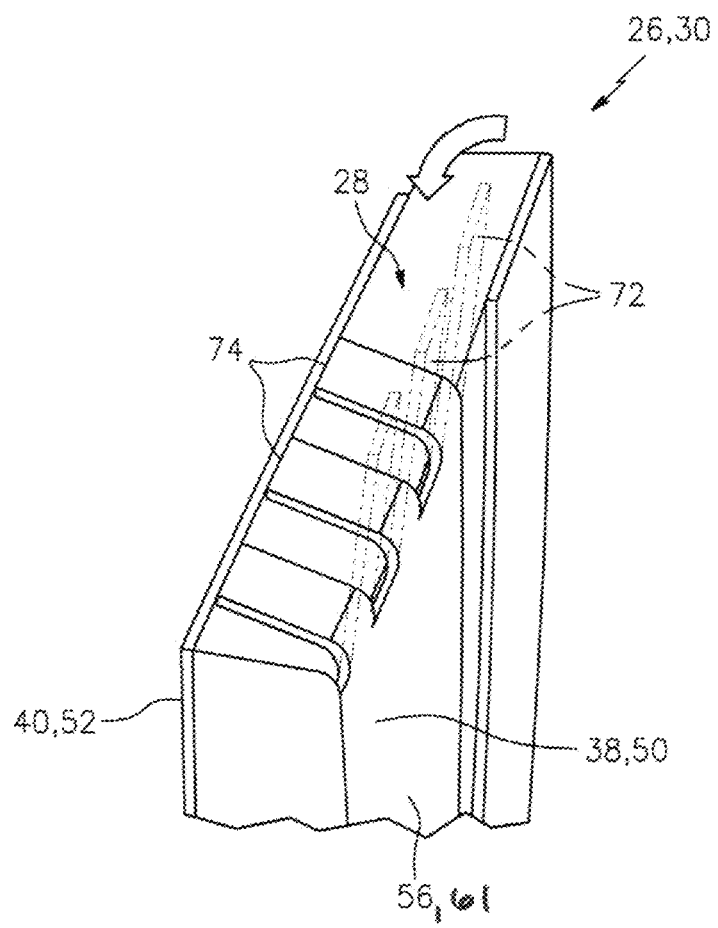
FIG. 15A is a perspective illustration of formation of projections on a tip of the rotor blade.

Referring to FIG. 5, at least one of the panels 56 and 58 such as the first side panel 56 (and/or alternatively the second side panel 58) may be configured with one or more tabs 72; e.g., extensions, strips of material. Each of these tabs 72 is bonded (e.g., adhered, welded or brazed) the underlying airfoil body 54 at the tip 28; e.g., see bonding material 73 (e.g., adhesive or braze or weld) in FIGS. 12-14. Each tab 72 thereby forms a respective projection 74 on the tip 28 of the airfoil 30 shown in exaggerated form in FIGS. 3 and 4 for ease of illustration. The projections 74 are regularly (or irregularly) arranged longitudinally along at least an extended portion (e.g., at least 50-75%) of, or an entirety of, a camber line length of the tip 28 in a linear array, which length extends longitudinally along the camber line 48 from the leading edge 42 to the trailing edge 44. In this embodiment, the tabs may be formed simply by bending sheet metal tabs of extended material beyond the tip 28 on the forward or pressure side of the blade 26, as shown in FIG. 15A. Alternatively, the tabs can be formed from the following side cover segments 58 and 69; however, such tabs may not have the benefit that the forward side tabs have where rub loading pushes the forward side tabs down onto the tip.

Figure 5A:
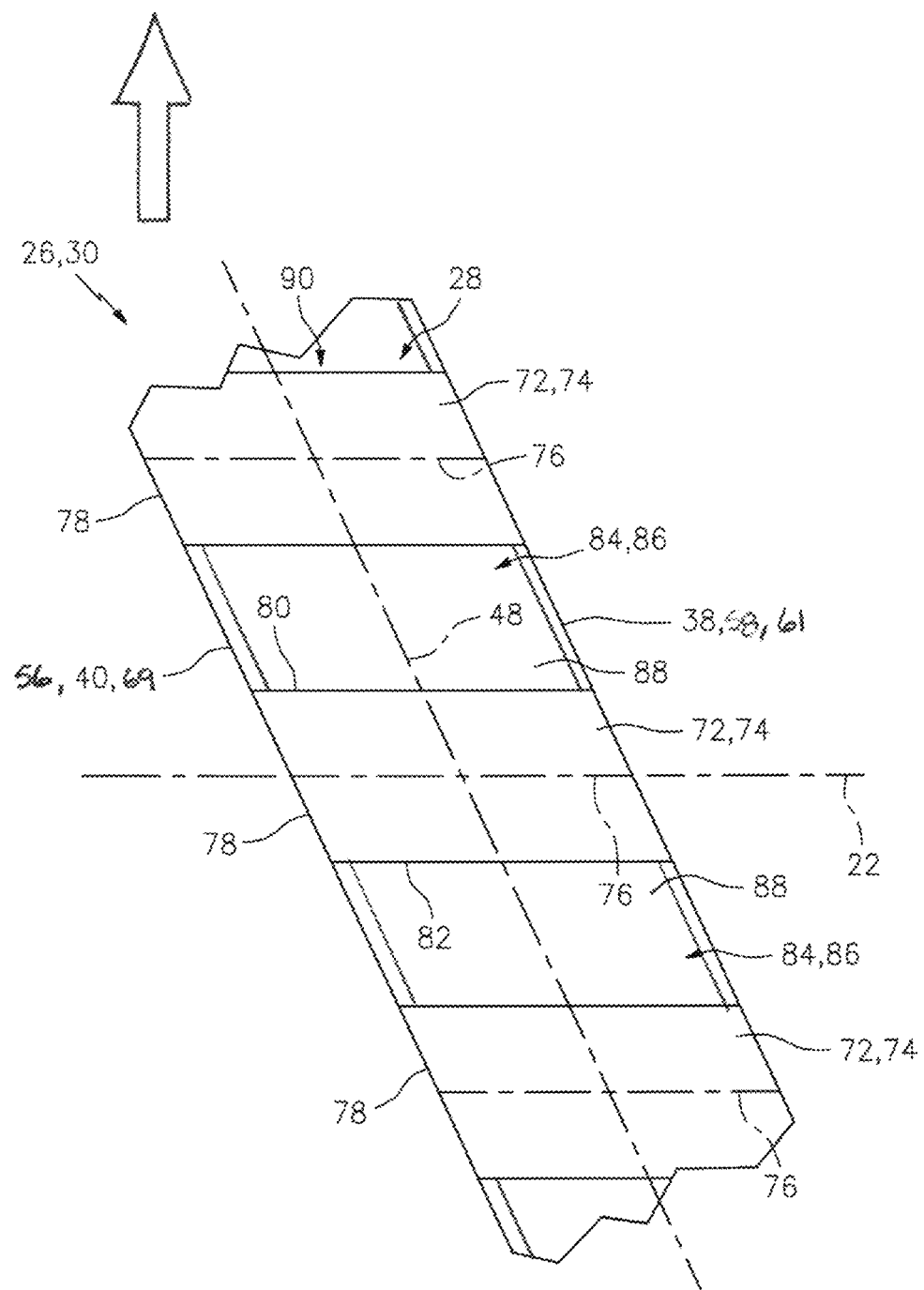
FIG. 5A is an illustration of a portion of a tip of the rotor blade encircled in FIG. 5.
Figure 15B:
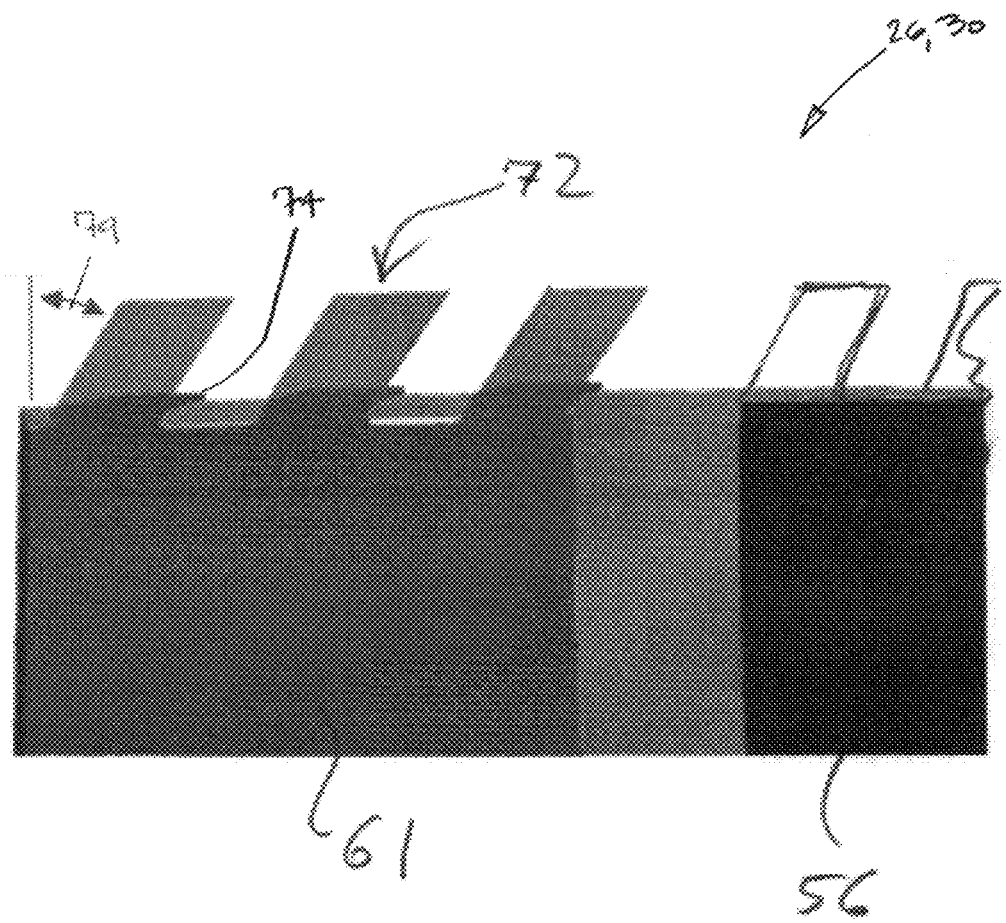
FIG. 15B is another perspective illustration of the formation of the projections on the tip of the rotor blade.

Referring to FIG. 5A, each of the projections 74 extends laterally along a centerline 76 of that respective projections 74 from a respective segment (e.g., 60, 61 or 62) of the first side panel 56 to a distal end 78. This distal end 78 may be located at the second side 40 of the airfoil 30 as shown in FIG. 5A. One or more or each projection 74 may thereby extend laterally across the tip 28 between from the first side 38 to the second side 40. Alternatively, the distal end 78 may be recessed inward from the second side 40 of the airfoil 30 such that the respective projection 74 extends laterally across the tip 28 partially to the second side 40, or vice versa. The centerlines 76 of the projections 74 may be configured parallel with one another as illustrated in FIG. 5A. In addition, the centerline 76 of each projection 74 are configured to be generally parallel with the rotational axis 22 of the turbine engine rotor 20 and its respective rotor blade 26/airfoil 30 so that the forward projections help shield the distal ends of the mating following projections when they rub on the rub strip. To achieve an angle parallel to the rotational axis 22, the angle (see angle 79 in FIG. 15B) used for cutting the tabs) is the complement of a chord angle 81 in FIG. 5. The spacing between the tabs can vary. However, generally speaking, the spacing should be large enough to provide necessary cooling during rubs, but not so large that leakage occurs or the following tab is heavily loaded during rub events. The present disclosure, however, is not limited to such an exemplary configuration as discussed below.

Each of the projections 74 extends longitudinally between opposing upstream and downstream projection sides 80 and 82. A width of each projection 74 between the sides 80 and 82 may be constant as the projection 74 extends along its centerline 76. Alternatively, the width may increase or decrease as the respective projection 74 extends to its distal end 78.

Each of the projections 74 is longitudinally separated from each longitudinally adjacent (e.g., neighboring) one of the projections 74 by a gap 84. This gap 84 forms a channel 86 (e.g., groove) in the tip 28 of the airfoil 30. In particular, the channel 86 extends spanwise (e.g., radially) into the airfoil 30 from the tip 28 to a channel end 88. The channel 86 extends laterally through the airfoil 30 between the first and the second sides 38 and 40. The channel 86 extends longitudinally within the airfoil 30 between a respective opposing pair of the projection sides 80 and 82. The channel 86 offers the additional benefit of cooling the tabs/projections 74 during rub events as air flows between them.

With the foregoing configurations, the projections 74 of FIG. 5 provide the tip 28 of the airfoil 30 with a castellated tip surface 90; e.g., a grooved and/or toothed tip surface. This castellated tip surface 90 extends longitudinally along the camber line 48, for example, from or proximate the leading edge 42 to or proximate the trailing edge 44. The castellated tip surface 90 extends laterally across the tip 28 between and to the first side surface 50 and the second side surface 52. Spanwise (e.g., radially) outer portions of the castellated tip surface 90 are formed by the projections 74 and, in some embodiments, the leading edge sheath 64 and/or the trailing edge sheath 66. Spanwise (e.g., radially) inner portions of the castellated tip surface 90 are formed by exposed portions of the airfoil body 54 at the tip 28; e.g., the channel ends 88 (see FIG. 5A).

One or more of each of the panels 56 and 58 may be constructed from a panel material such as, but not limited to, metal. The panel material is different than the airfoil body material. The panel material, for example, may be selected to be harder and/or more foreign object impact resistant than the airfoil body material. An example of the panel material metal is, but is not limited to, titanium (Ti) or titanium or Nickel alloy.

Figure 6:
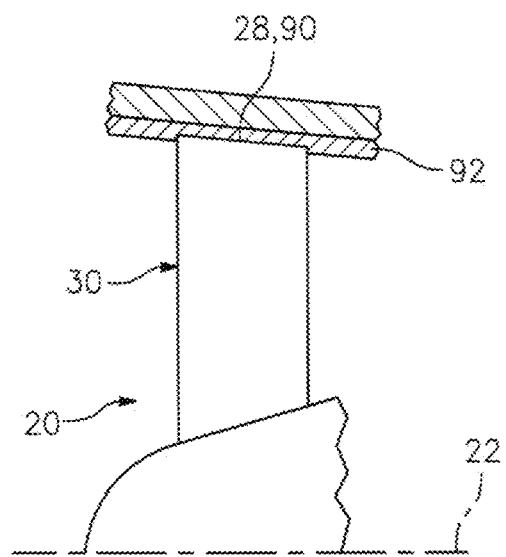
FIG. 6 is a partial illustration of the turbine engine rotor within an engine case.
Figure 7:
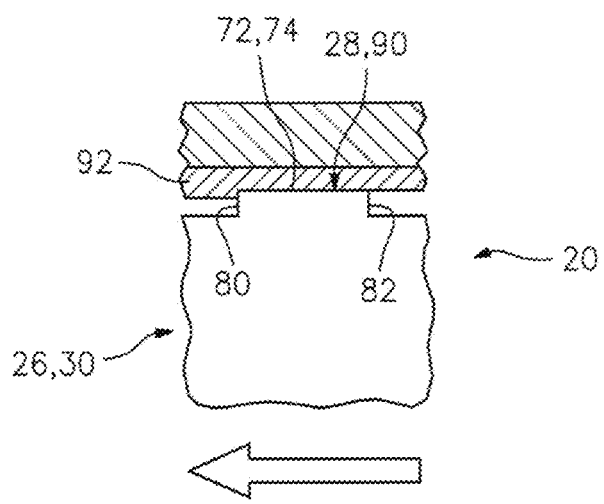
FIG. 7 is a partial illustration of a tip portion of the turbine engine rotor engaging a rub strip within the engine case.

Referring to FIG. 6, after initial installation of the turbine engine rotor 20 in the gas turbine engine, the airfoils 30 may initially contact an outer rub strip 92 (e.g., an abradable shroud) circumscribing the rotor 20 during engine break in. During such contact, one or more tips 28 of the rotor blades 26 may contact the outer rub strip 92. Referring to FIG. 7, the projections 74 are configured as teeth (e.g., saw teeth, cutting edges) and may relatively quickly cut away a portion of the rub strip 92 against which the tips 28 contact. This cutting action may form a slight annular groove in a surface of the rub strip 92. This self-fitting of the turbine engine rotor 20 and its blades 26 to the engine may enable minimized radial clearances between the rotor blades 26 and the surround case. Minimizing clearances in turn may reduce airflow leakage over the tips 28 and thereby increase gas turbine engine efficiency.

In addition to the foregoing, by providing the tips 28 with the castellated tip surfaces 90, the projections 74 are operable to cut away the rub strip material as described above. By contrast, in a case of a blade with a smooth (not castellated/configured without the projections 74) tip surface, the tip may continuously rub against the rub strip material for a longer period of time. Such temporally elongated rubbing can generate a relatively large quantity of heat, which heat may break down bonds within, for example, a composite airfoil body, or melt any protective airfoil coatings, like polyurethane.

Figure 8:
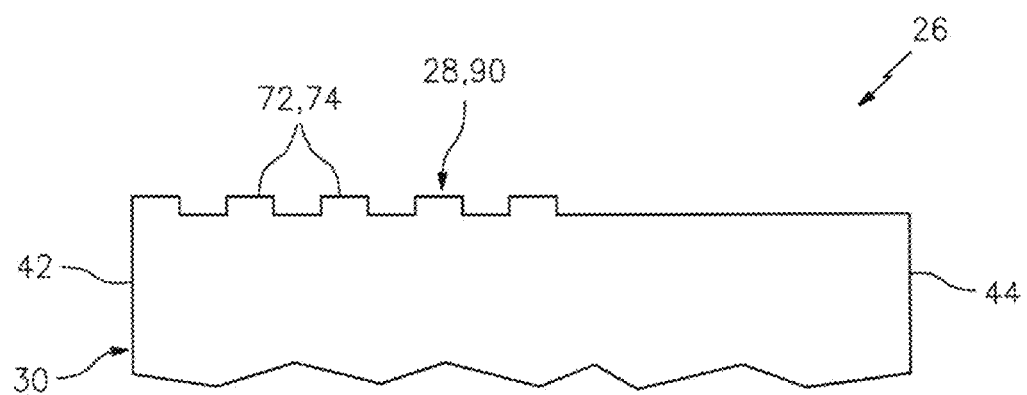
FIGS. 8-14 are partial illustrations of tip portions of alternate rotor blades.
Figure 9:
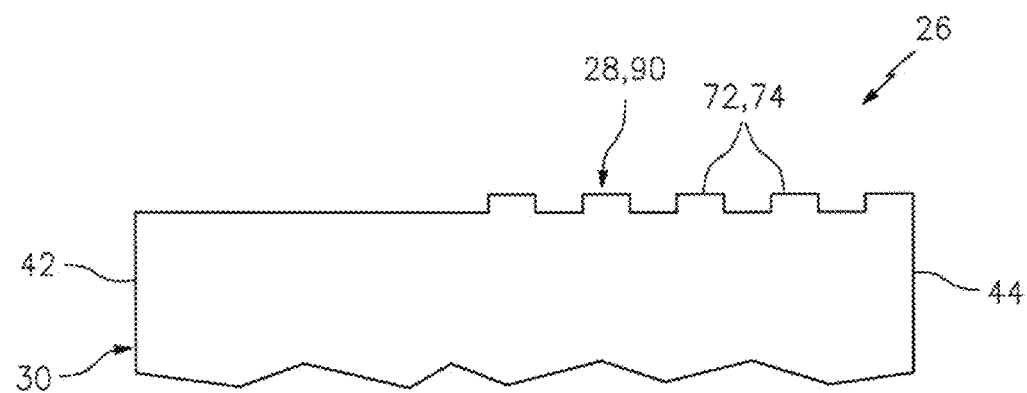

The castellated tip surface 90 may extend between the leading edge 42 and the trailing edge 44 as described above; e.g., see FIG. 5. However, in other embodiments, the castellated tip surface 90 may only extend along a select length of the tip 28. The castellated tip surface 90, for example, may extend from the leading edge 42 partially to the trailing edge 44 as shown in FIG. 8. In another example, the castellated tip surface 90 may extend from the trailing edge 44 partially to the leading edge 42 as shown in FIG. 9.

Figure 10:
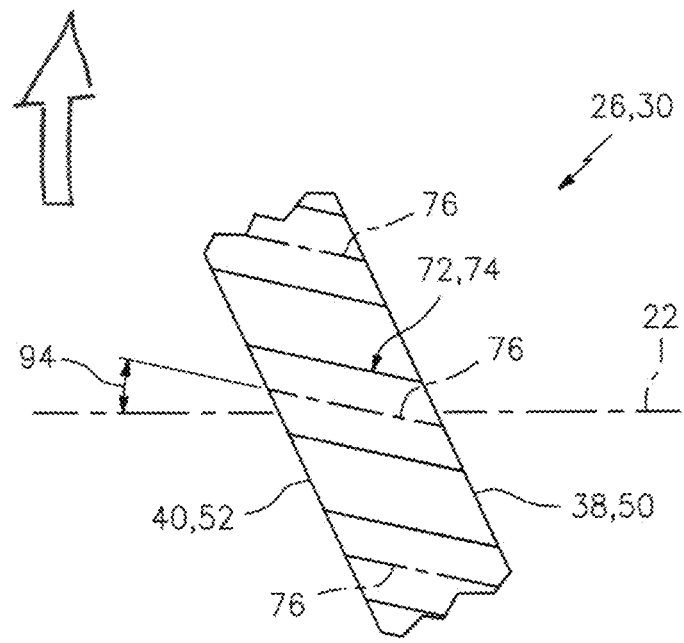
Figure 11:
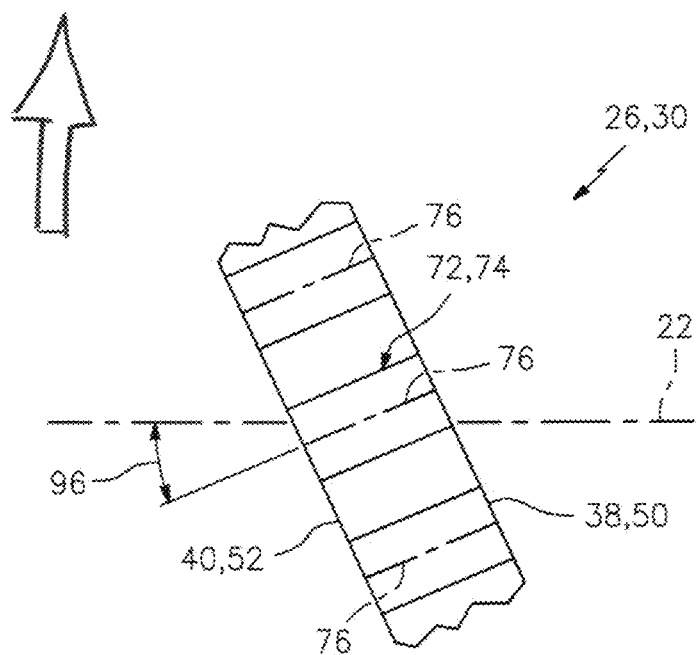

In some embodiments, referring to FIGS. 10 and 11, the centerline 76 of one or more or each of the projections 74 on a respective blade 26 may be angularly offset from the rotational axis 22 by an angle; e.g., an acute angle. The centerline 76 of FIG. 10, for example, is angularly offset from the rotational axis 22 by a positive angle 94 such that the projection 74 is canted towards the leading edge 42. This positive angle 94 will help pump air aft to aid fan efficiency, help reduce leakage and improve aerodynamic tip stability In another example, the centerline 76 of FIG. 11 is angularly offset from the rotational axis 22 by a negative angle 96 such that the projection 74 is canted towards the trailing edge 44. Negative angles offer the benefit that the tabs/projections 74 are more aligned with the direction of rotation and would see less stress when rub occurs.

Figure 12:
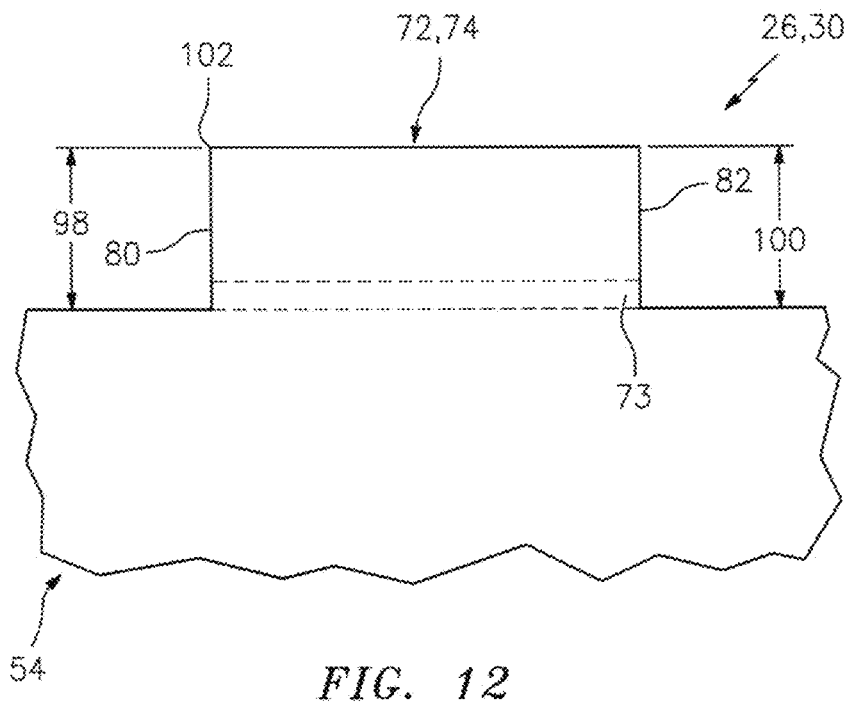
Figure 13:
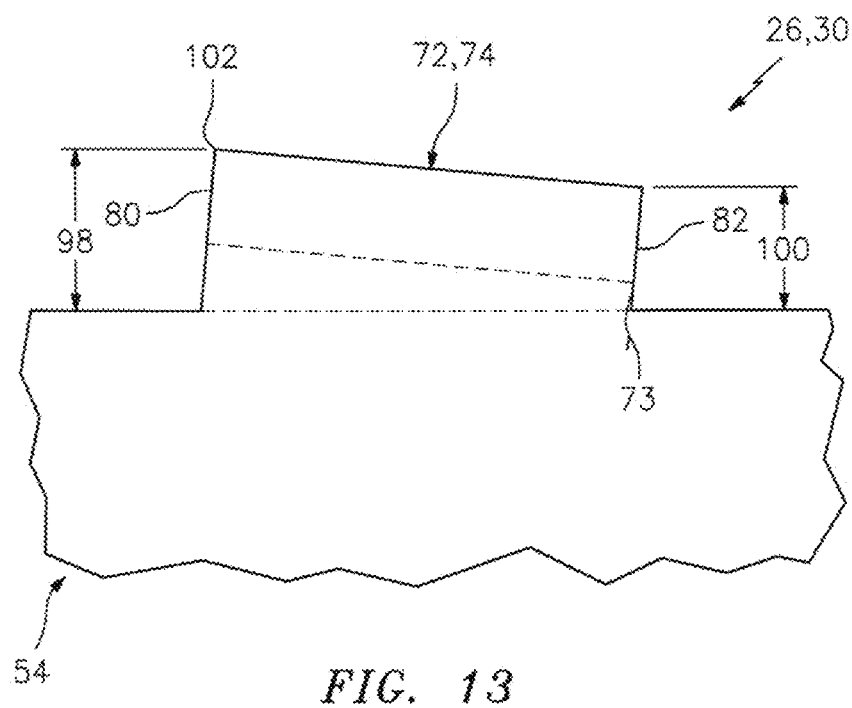

Referring to FIGS. 12 and 13, each projection 74 has an upstream spanwise (e.g., radial) height 98 at its upstream projection side 80. Each projection 74 has a downstream spanwise (e.g., radial) height 100 at its downstream projection side 82. The upstream spanwise height 98 may be equal to the downstream spanwise height 100 as shown in FIG. 12. Alternatively, the upstream spanwise height 98 may be different (e.g., greater) than the downstream spanwise height 100 as shown in FIG. 13. With such a configuration, an outer edge 102 of the projection 74 along the upstream projection side 80 is proud and thereby further configured as a cutting edge. In addition or alternatively, referring to FIG. 14, the outer edge 102 may be configured as a sharp (e.g., acutely angled) outer edge 104.

As described above, the projections 74 may be formed by tabs 72 from at least one of the panels 56 and 58; e.g., the first side panel 56. With such a configuration, the tabs 72 may be formed in the panel 56 and then folded over and bonded to the airfoil body 54 during manufacture; e.g., see FIG. 15A.

Figure 16:
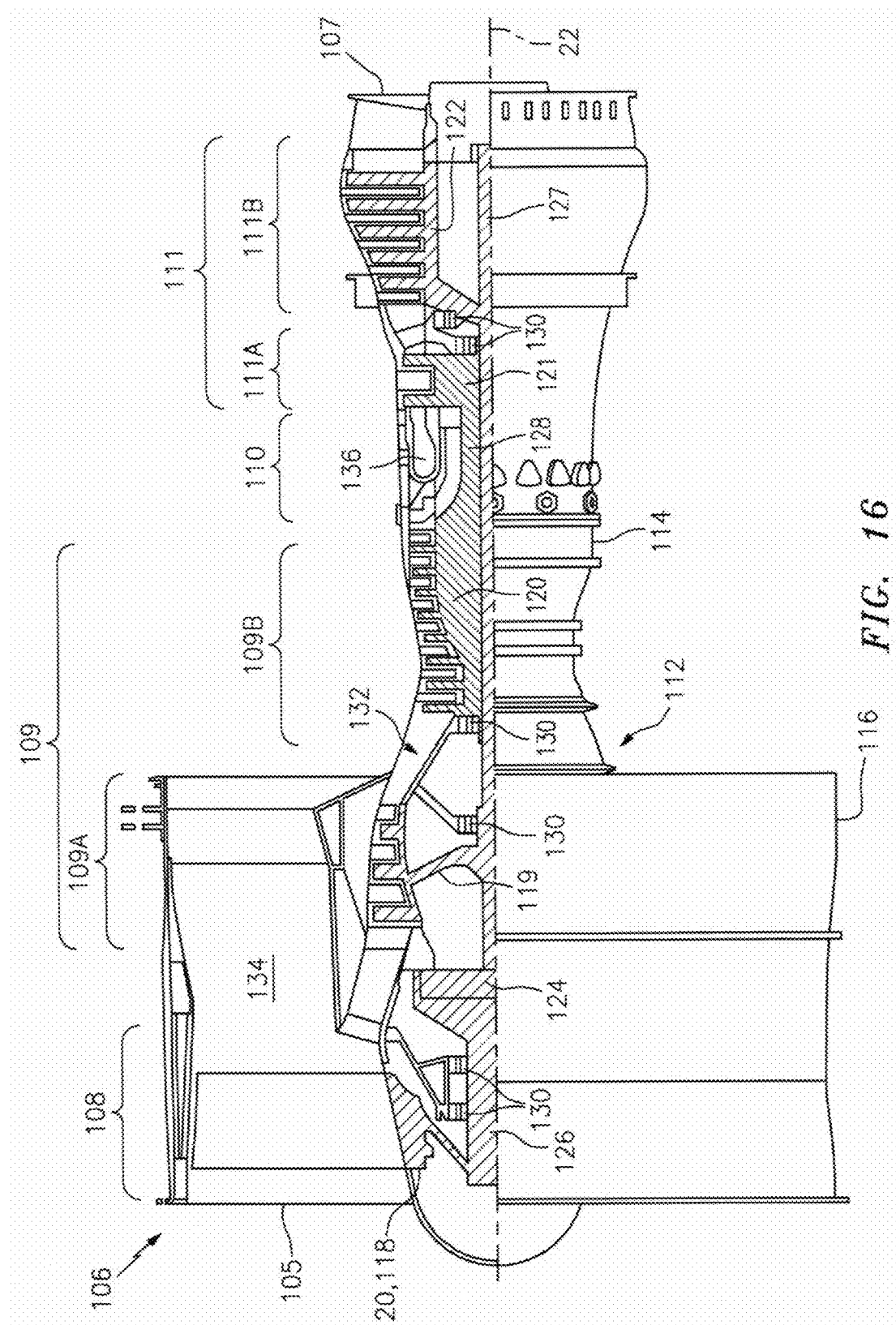
FIG. 16 is a side cutaway illustration of a geared turbofan gas turbine engine.

FIG. 16 is a side cutaway illustration of a geared turbine engine 106 with which the turbine engine rotor 20 may be configured. This turbine engine 106 extends along the rotational axis 22 between an upstream airflow inlet 105 and a downstream airflow exhaust 107. The turbine engine 106 includes a fan section 108, a compressor section 109, a combustor section 110 and a turbine section 111. The compressor section 109 includes a low pressure compressor (LPC) section 109A and a high pressure compressor (HPC) section 109B. The turbine section 111 includes a high pressure turbine (HPT) section 111A and a low pressure turbine (LPT) section 111B.

The engine sections 108-111B are arranged sequentially along the rotational axis 22 within an engine housing 112. This housing 112 includes an inner case 114 (e.g., a core case) and an outer case 116 (e.g., a fan case). The inner case 114 may house one or more of the engine sections 109A-111B; e.g., an engine core. The outer case 116 may house at least the fan section 108.

Each of the engine sections 108, 109A, 109B, 111A and 111B includes a respective rotor 118-122, one of which may be or include the turbine engine rotor 20. Each of these rotors 118-122 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 118 (e.g., the turbine engine rotor 20) is connected to a gear train 124, for example, through a fan shaft 126. The gear train 124 and the LPC rotor 119 are connected to and driven by the LPT rotor 122 through a low speed shaft 127. The HPC rotor 120 is connected to and driven by the HPT rotor 121 through a high speed shaft 128. The shafts 126-128 are rotatably supported by a plurality of bearings 130; e.g., rolling element and/or thrust bearings. Each of these bearings 130 is connected to the engine housing 112 by at least one stationary structure such as, for example, an annular support strut.

During operation, air enters the turbine engine 106 through the airflow inlet 105. This air is directed through the fan section 108 and into a core gas path 132 and a bypass gas path 134. The core gas path 132 extends sequentially through the engine sections 109A-111B. The air within the core gas path 132 may be referred to as "core air". The bypass gas path 134 extends through a bypass duct, which bypasses the engine core. The air within the bypass gas path 134 may be referred to as "bypass air".

The core air is compressed by the compressor rotors 119 and 120 and directed into a combustion chamber 136 of a combustor in the combustor section 110. Fuel is injected into the combustion chamber 136 and mixed with the compressed core air to provide a fuel-air mixture. This fuel air mixture is ignited and combustion products thereof flow through and sequentially cause the turbine rotors 121 and 122 to rotate. The rotation of the turbine rotors 121 and 122 respectively drive rotation of the compressor rotors 120 and 119 and, thus, compression of the air received from a core airflow inlet. The rotation of the turbine rotor 122 also drives rotation of the fan rotor 118, which propels bypass air through and out of the bypass gas path 134. The propulsion of the bypass air may account for a majority of thrust generated by the turbine engine 106, e.g., more than seventy-five percent (75%) of engine thrust. The turbine engine of the present disclosure, however, is not limited to the foregoing exemplary thrust ratio.

The turbine engine rotor 20 and its rotor blades 26 may be included in various turbine engines other than the one described above. The turbine engine rotor 20 and its rotor blades 26, for example, may be included in a geared turbine engine where a gear train connects one or more shafts to one or more rotors in a fan section, a compressor section and/or any other engine section. Alternatively, the turbine engine rotor 20 and its rotor blades 26 may be included in a turbine engine configured without a gear train. The turbine engine rotor 20 and its rotor blades 26 may be included in a geared or non-geared turbine engine configured with a single spool, with two spools (e.g., see FIG. 16), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A rotor blade for a turbine engine, comprising:
   an airfoil extending longitudinally between a leading edge and a trailing edge;
   the airfoil extending spanwise to a tip;
   the airfoil configured with a plurality of projections arranged longitudinally along the tip;
   the airfoil including a body and a panel covering a portion of the body on a pressure side of the airfoil; and
   the panel including a plurality of tabs that form the projections.

2. The rotor blade of claim 1, wherein the projections are configured to provide the tip with a castellated tip surface.

3. The rotor blade of claim 2, wherein the castellated tip surface extends longitudinally from the leading edge to the trailing edge.

4. The rotor blade of claim 2, wherein the castellated tip surface extends longitudinally from the leading edge partially towards the trailing edge.

5. The rotor blade of claim 2, wherein the castellated tip surface extends longitudinally from the trailing edge partially towards the leading edge.

6. The rotor blade of claim 1, wherein
   the airfoil extends laterally between the pressure side and a suction side; and
   a first of the projections extends at least partially across the tip from the pressure side towards the suction side.

7. The rotor blade of claim 1, wherein
   a first of the projections extends along a centerline at least partially across the tip between the pressure side of the airfoil and a suction side of the airfoil; and
   the centerline is parallel with a rotational axis of the rotor blade.

8. The rotor blade of claim 1, wherein
   a first of the projections extends along a centerline at least partially across the tip between the pressure side of the airfoil and a suction side of the airfoil; and
   the centerline is angularly offset from a rotational axis of the rotor blade by an acute angle.

9. The rotor blade of claim 1, wherein
   a first of the projections extends along a first centerline at least partially across the tip between the pressure side of the airfoil and a suction side of the airfoil;
   a second of the projections extends along a second centerline at least partially across the tip between the pressure side of the airfoil and the suction side of the airfoil; and
   the first centerline is parallel with the second centerline.

10. The rotor blade of claim 1, wherein
    a first of the projections extends longitudinally between a first projection side and a second projection side;

the first of the projections has a first spanwise height at the first projection side; and the first of the projections has a second spanwise height at the second projection side that is equal to the first spanwise height.

11. The rotor blade of claim 1, wherein a first of the projections extends longitudinally between a first projection side and a second projection side;

the first of the projections has a first spanwise height at the first projection side; and the first of the projections has a second spanwise height at the second projection side that is different than the first spanwise height.

12. The rotor blade of claim 1, wherein a first of the projections extends longitudinally between a first projection side and a second projection side; and the first of the projections is configured with a sharp outer edge along the first projection side.

13. The rotor blade of claim 1, wherein the airfoil includes the body and the projections are bonded to the body.

14. The rotor blade of claim 13, wherein the body comprises composite material and the projections comprise metal.

15. The rotor blade of claim 13, wherein the body comprises a first metal and the projections comprise a second metal that is different than the first metal.

16. The rotor blade of claim 1, wherein the airfoil is configured as a fan blade airfoil.

17. A rotor blade for a turbine engine, comprising:

an airfoil configured with a first side, a second side, a leading edge, a trailing edge, a base and a tip;

the first side and the second side each extending longitudinally between the leading edge and the trailing edge, and the first side and the second side each extending spanwise from the base to the tip;

the airfoil including an airfoil body and a panel covering a portion of the airfoil body on the first side; and the panel configured with a plurality of tabs bonded to the airfoil body at the tip, the tabs extending across the body at least partially from the first side to the second side.

18. The rotor blade of claim 17, wherein the tabs are configured to provide the tip with a castellated tip surface.

\* \* \* \* \*